April 17, 1928.  1,666,568

A. JACKSON

GLARE OR LIGHT SHIELD

Filed June 16, 1927

Inventor
Avis Jackson
By Adam E. Fisher
Attorney

Patented Apr. 17, 1928.

1,666,568

UNITED STATES PATENT OFFICE.

AVIS JACKSON, OF EAST ST. LOUIS, ILLINOIS.

GLARE OR LIGHT SHIELD.

Application filed June 16, 1927. Serial No. 199,186.

This invention relates to glare or light shields for use upon automobiles to prevent the glare of approaching headlights from blinding the driver, or to shield the eyes of the driver from other light rays, such as the rays of the sun.

The object of the invention is to provide a relatively simple, practical and efficient device of the kind which may be readily attached to the windshield of an automobile, and may be easily lowered into operative position in the line of vision, or elevated out of the line of vision when not required for use.

In the drawing

Figure 1:
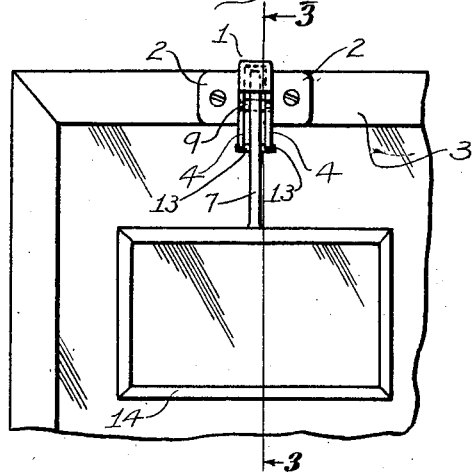
Figure 1 is a rear elevation of a section of an automobile windshield, showing the device as attached to the upper frame thereof and with the light shutter lowered into operative position in the line of vision.
Figure 2:
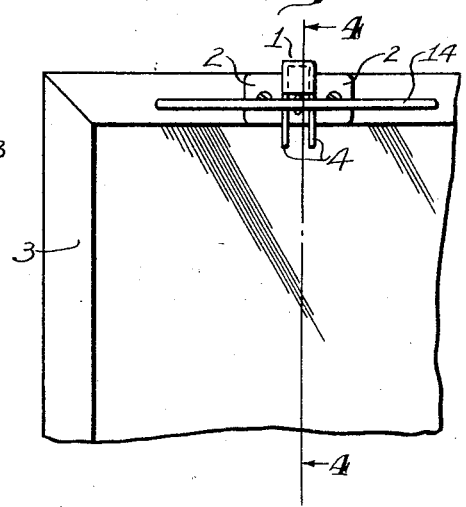
Figure 2 is a view similar to that shown in Figure 1, except that the light shutter is shown elevated out of the line of vision.
Figure 3:
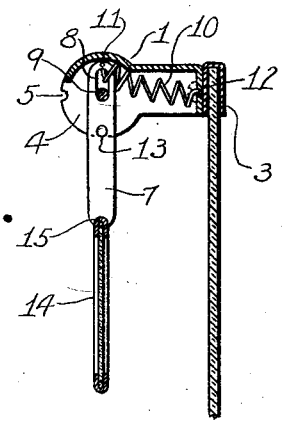
Figure 3 is a cross section taken on the line 3—3 of Figure 1.
Figure 4:
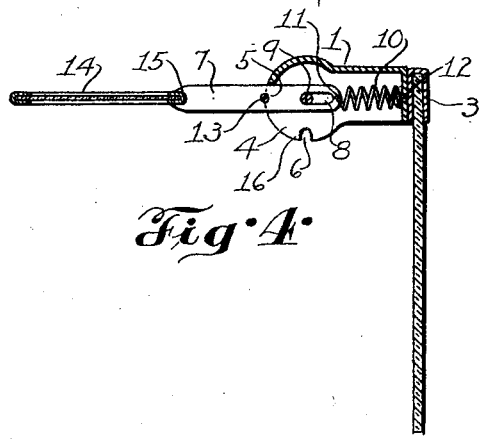
Figure 4 is a cross section taken on the line 4—4 of Figure 2.
Figure 5:
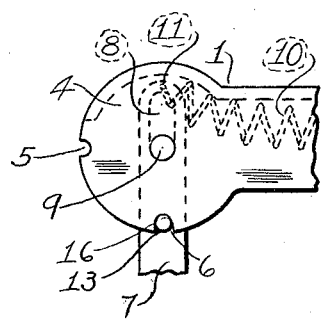
Figure 5 is a detail of the adjustable locking mechanism for adjustably locking the light shutter arm into operative or inoperative position relative to the windshield.

In carrying out this invention, I provide a hollow bracket 1 having lateral lugs 2 whereby it may be secured to the inner side of the windshield frame 3 of the automobile (not shown). The outer end of the hollow bracket 1 is flattened and rounded off to form spaced, disc-like ears 4, the planes of which are disposed vertically relative to the frame 3, and in the peripheries of which are formed transversely aligned pairs of lock notches 5 and 6, one pair of the notches, as 5, being located in the longitudinal axis of the bracket 1, and the other pair, as 6, being located downwardly and ninety degrees from the pair designated as 5. The lower notches 6 are offset forwardly as shown at 16, for a purpose to be explained later. A flat shutter arm 7 is provided, the same being adapted to slidably pass between the two ears 4 and having the slots 8 formed longitudinally through its inner end. The arm 7 is anchored within the hollow bracket 1 by means of a pivot pin 9 passed through the ears 4 and through the slot 8. A retractile coil spring 10 is connected at the points 11 and 12 with the inner extremity of the arm 7 and the end of the hollow bracket 1, thereby normally drawing the arm 7 inwardly.

A latch pin 13 is passed through the arm 7 in such relation to the slot 8, ears 4 and notches 5 and 6, that as the arm 7 is drawn inwardly between the ears 4, the pivot pin 9 will be positioned at the outer end of the slot 8 coincidently with the latch pin 13 engaging the lock notches 5 or 6. A conventional form of light shutter 14 is attached at 15 to the end of the arm 7.

In use the arm 7 and shutter 14 can readily be positioned horizontally out of the line of the driver's vision, when the shutter 14 is not required, by locating the pin 13 in the notches 5; and on the other hand when the driver desires to interpose the shutter 14 in his line of vision so as to protect his eyes against confusing light rays, he simply pulls outwardly on the arm 7, thereby releasing the pin 13 from the notches 5 and then turns the arm 7 downwardly and relocates the pin 13 in the lower notches 6—16. In the latter position the latch pin 13 hangs within the horizontal offsets 16 of the notches 6.

Any minor changes or alterations may be made in the structure and elements as here described and illustrated, without departing from the spirit of my invention as defined in the appended claims.

I claim:

1. In combination with the windshield of an automobile, a light shield, comprising a hollow bracket horizontally secured to the inner side of the windshield, the outer end of the bracket being formed into two spaced, disc-like and vertically disposed ears, the said ears having pairs of transversely aligned lock notches cut in their peripheries; a shutter arm slidably passed between the two ears, the inner end of the arm having a longitudinally disposed slot; a pivot pin passed through the said bracket ears and through the slot of the shutter arm; a retractile spring connecting the inner end of the shutter arm and the end of the hollow bracket for normally drawing the shutter arm inwardly of the bracket; a latch pin passed through the shutter arm and adapted to engage the lock notches of the said bracket ears; and a light shutter at the end of the shutter arm.

2. In combination with the windshield of an automobile, a light shield, comprising a bracket secured to the windshield, the said bracket having a pair of spaced, vertically disposed disc-like ears, the said ears having transversely aligned pairs of peripheral lock notches; a shutter arm slidably mounted between the said ears, the said arm having a longitudinal slot through its inner end; a pivot pin passed transversely through the center of the ears and through the said slot of the shutter arm; a latch pin in the shutter arm adapted to engage the peripheral lock notches of the said ears; and means for normally drawing the shutter arm inwardly between the said ears of the bracket.

3. In combination with the windshield of an automobile, a light shield, comprising a hollow bracket extended from the windshield; a pair of spaced, vertically disposed, disc-like ears at the free end of the bracket, the said ears having two transversely aligned pairs of peripheral lock notches, the upper pair of notches being approximately in the longitudinal axis of the bracket and the lower pair of notches being spaced circumferentially below the upper pair approximately ninety degrees and having offset extensions; a shutter arm slidably mounted between the said ears, the said arm having a longitudinal slot through its inner end; a pivot pin passed centrally through the said bracket ears and through the said slot of the shutter arm; a latch pin in the shutter arm adapted to engage the peripheral lock notches of the bracket ears; and means for normally drawing the shutter arm inwardly between the said bracket ears.

In testimony whereof I affix my signature.

AVIS JACKSON.